United States Patent [19]

Nickola

[11] Patent Number: 4,887,187

[45] Date of Patent: Dec. 12, 1989

[54] PLURAL UTILITY SUPPLY PEDESTAL INCLUDING CONTAINED COMMON GROUNDING MEANS

[76] Inventor: Anne D. Nickola, G-6261 N. Saginaw Rd., Mt. Morris, Mich. 48458

[21] Appl. No.: 206,603

[22] Filed: Jun. 14, 1988

Related U.S. Application Data

[63] Continuation-in-part of Ser. No. 869,687, Jun. 2, 1986, Pat. No. 4,751,610.

[51] Int. Cl.[4] .............................................. H02B 9/00
[52] U.S. Cl. ..................................... 361/369; 174/51; 361/428; 439/92
[58] Field of Search .................. 174/37, 38, 45 R, 51; 361/331, 334, 364, 369, 370-373, 417, 419, 420, 332, 424-428, 356-358; 439/92, 100

[56] References Cited

U.S. PATENT DOCUMENTS

| | | |
|---|---|---|
| D. 204,269 | 4/1966 | Naudus, Jr. . |
| 438,773 | 10/1890 | Dinn . |
| 1,481,280 | 1/1924 | Bivens . |
| 1,972,187 | 9/1934 | Farnam ..................................... 247/1 |
| 2,982,593 | 5/1961 | Chambers ........................... 312/223 |
| 3,015,024 | 12/1961 | Charchan et al. ...................... 240/2 |
| 3,167,609 | 1/1965 | Brann ..................................... 174/70 |
| 3,180,920 | 4/1965 | Fletcher et al. ....................... 174/38 |
| 3,215,831 | 11/1965 | Gladsden et al. ..................... 240/84 |
| 3,238,289 | 3/1966 | Rowe ..................................... 174/72 |
| 3,257,496 | 6/1966 | Hamilton ............................... 174/38 |
| 3,341,268 | 9/1967 | Bickford ............................. 312/100 |
| 3,341,744 | 9/1967 | Barwick ............................. 317/106 |
| 3,361,938 | 1/1968 | Watson ............................... 317/120 |
| 3,415,942 | 12/1968 | Knoy ..................................... 174/51 |
| 3,435,124 | 3/1969 | Channell ............................... 174/38 |
| 3,450,951 | 6/1969 | Boyle ................................. 317/105 |
| 3,502,785 | 3/1970 | Nickola ................................ 174/38 |
| 4,234,756 | 11/1980 | Jackula ................................. 174/38 |
| 4,243,834 | 1/1981 | Logioco ................................ 174/51 |
| 4,751,610 | 6/1988 | Nickola ............................... 361/369 |

Primary Examiner—Gerald P. Tolin
Attorney, Agent, or Firm—Gifford, Groh, Sheridan, Sprinkle and Dolgorukov

[57] ABSTRACT

A mounting pedestal supports an electrical meter and power box and other utility supply devices in a compact and safe arrangement for their provision to a mobile home. A hollow, plastic post is supported in an upright position in the ground or in concrete, and the power box and meter are attached to an L-shaped mounting bracket atop the post. The meter, power box and other utility supply devices are connected to a common ground contained in the post. The common ground includes a ground wire extending interiorly of the post and a shared electrical connector contained in the post, connected to the ground wire and the ground wires of each of the utility supply devices.

13 Claims, 1 Drawing Sheet

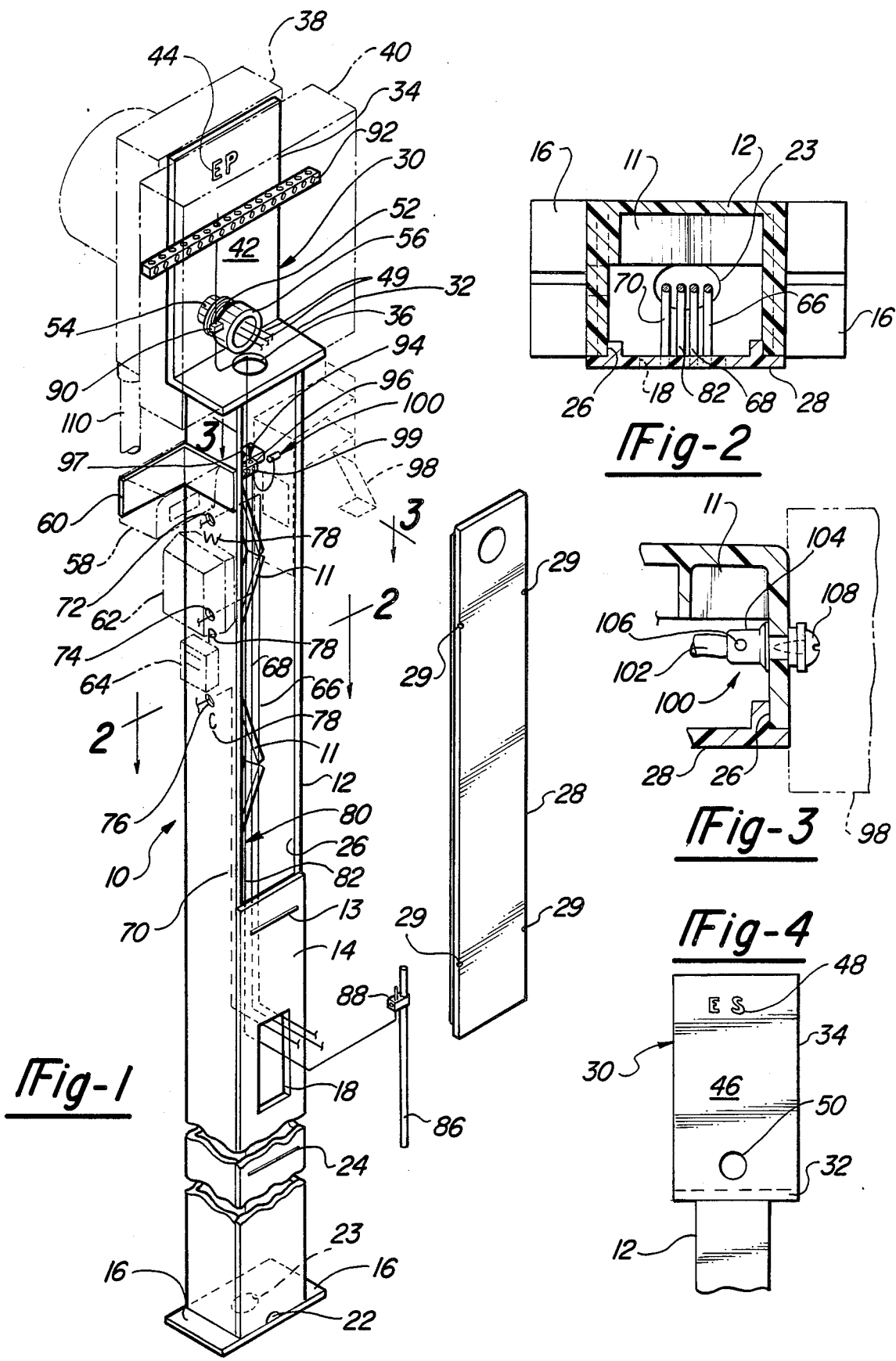

PLURAL UTILITY SUPPLY PEDESTAL INCLUDING CONTAINED COMMON GROUNDING MEANS

CROSS-REFERENCE TO RELATED APPLICATION

This application is a continuation-in-part of Applicant's co-pending application Ser. No. 869,687, filed June 2, 1986, now U.S. Pat. No. 4,751,619, which is expressly incorporated by reference herein, insofar as not inconsistent with the additional disclosure in this application.

BACKGROUND OF THE INVENTION

I. Field of the Invention the present invention relates to mounting pedestals for utilities, and more particularly, to a mounting pedestal for the compact and safe mounting of an electrical meter, an electrical power box, a telephone junction box, a television jack, a water cyclometer or meter, and a gas meter, for conveniently furnishing such utilities to a mobile home or other facility.

II. Description of the Prior Art

Conventionally, utilities such as electrical power, telephone service, cable television service, water and gas have been provided to mobile homes and other facilities through separate lines and conduits leading from individual meters and junction boxes. These utility meters and junction boxes were often supported in the vicinity of the mobile home but placed at separate loctions, each location being selected by the particular company supplying each utility. In mobile home parks, if there were no conveniently located tree or utility pole near the mobile home, each utility company often drove a post into the ground to support its particular meter or junction box for servicing one or more nearby mobile homes. For convenience, sometimes the meters or junction boxes for a large number of mobile homes were centrally located, often at a single spot. This resulted in a tangle of utility wires and pipes which was both visually displeasing and inconvenient to connect or disconnect upon installation or removal of a particular mobile home from its site. Especially when centrally located meters were employed, if deactuation of the utility supplies was necessary (such as in the cause of fire or other disaster) such deactuation was delayed due to the remoteness of the meters from the mobile homesite requiring deactuation.

My earlier mounting pedestal for utilities, U.S. Pat. No. Re. 31,359, granted Aug. 23, 1983, solved these and other problems relating to utility pedestals. However, my prior device did not address the problems of the expense of producing a unitary, grounded utility pedestal; the relatively short useful life of a metal pedestal, due to rusting, electrolytic corrosion or the like; and potential shorting of the electrical supply and the subsequent electrification of the pedestal if the power supply cable happens to rub against and be breached by the open bottom end of the post during installation, settling, tippage or the like.

SUMMARY OF THE PRESENT INVENTION

The present invention overcomes these and other problems by providing a low-cost and corrosion-free electrically nonconductive plastic post for mounting groundable utility devices. The post of the present invention includes a common ground means for such devices which is at least partly contained within the post. Preferably, the plastic post is hollow and is supported in an upright position in the ground. The post includes an L-shaped mounting bracket on the end not embedded in the ground, adapted for attachment of an electrical meter and an electrical power box or panel on opposite sides of an upwardly depending portion of the bracket.

A telephone junction box, a television jack, a water cyclometer or meter display and a gas meter are mountable on the sides of the plastic post, above the ground. The lines for the telephone junction box, the television jack and the service wire to the water cyclometer all enter the interior of the plastic post through a side aperture in the post positioned near the bottom of the post, below ground level. The lines extend upwardly inside the post and pass through openings in the top or sides of the post for connection to their associated utility devices.

The common ground means connects the neutral bar of the electrical through panel and through the utility supplies to earth. The common ground means comprises a ground wire extending from the electrical panel neutral bar interiorly of the post, electrically connected to at least one shared electrical connector. Each utility supply means is grounded to the shared connector. The end of the ground wire opposite the shared electrical connector is then electrically connected to a ground rod or otherwise grounded to earth. The input for electric services is in a separate and conventionally located conduit and connects into the bottom side of the meter base.

Connection of the newly installed utility devices to the post and to the common ground means is conveniently carried out by removing an elongated cover disposed on one side of the post, located above ground level. The removable cover hides an elongated aperture in one wall of the post extending along a substantial portion of the length of the post, from ground level up to the L-shaped bracket. The input lines or cables to the utility devices enter the interior of the post below ground level, and extend upwardly to the level of the devices, so that access to the input lines or cables is had through the elongated aperture. Thus, the installer of a particular utility does not have to take special steps to make a grounding connection to another utility's supply device; instead, the installer merely connects the particular utility's ground wire to the shared ground connector. Installation of such utility supply means is thereby facilitated so that the cost of providing such service can be reduced.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is a perspective view of the preferred embodiment of the present invention;

FIG. 2 is a cross-sectional view taken along line 2—2 of FIG. 1;

FIG. 3 is another cross-sectional view of the preferred embodiment of the present invention;

FIG. 4 is a rear elevational view of a portion of the preferred embodiment of the present invention.

DETAILED DESCRIPTION OF THE PREFERRED EMBODIMENT OF THE PRESENT INVENTION

With reference first to FIGS. 1 and 2, the pedestal according to the present invention is thereshown and first comprises a hollow, nonconducting, and elongated plastic post 12 of unitary construction. The post 12 is of generally rectangular cross-section and includes an alternating plurality of diagonal reinforcing ribs 11, each extending part way across the interior of the post 12. The post 12 is preferably about 8 feet long, with a cross section of approximately 4 by 5 inches. The sidewalls making up the post are preferably about one quarter inch thick.

On a front face 14 of the post 12 is marked a first ground level mark or line 13 approximately 60 inches from the lower end of the post 12. A pair of feet 16, together having an overall width of about 4 inches by 8 inches, are affixed to the lower end of the post 12 to assist retention of the post 12 in the ground, and to prevent its inadvertent removal and prevent tipping. The feet 16 are especially useful in areas which experience frost.

A lower aperture 18 is formed in a front face 14 of the post 12 between the feet 16 and the ground level mark 13. The aperture 18 permits the passage of inputs corresponding to each of the utility supply means (except the electrical input) into the hollow interior of the post 12. An appropriately dimensioned nylon grommet (not shown) can be inserted into the lower aperture 18 so as to prevent the intrusion of dirt or debris into the interior of the post 12. The lower end of the post 12 is also provided with a lateral drain hole 22 and a bottom drain hole 23. In many circumstances, only one of the drain holes 22 or 23 may be necessary.

The post 12 is buried in the ground to the level of the first ground line 13. However, the front face 14 of the pedestal 10 can also include a second ground line 24 approximately 24 inches from the feet 16 (at a location below the lower aperture 18) to indicate the level at which the post should be embedded in concrete, if such method of affixment in position is instead desired.

An elongated upper aperture 26 is formed in the front face 14 of the post 12 above the first ground line 13, extending substantially to the upper end of the post 12. A rectangular cover 28 is dimensioned to be received in and to cover the second elongated upper aperture 26. The cover 28 is fastened to the post 12 by a plurality of screws (not shown) passing through a plurality of pilot holes 29.

The pedestal 10 of the present invention also comprises a preferably L-shaped bracket 30 affixed atop and preferably unitarily formed with the post 12. The bracket 30 includes a horizontal base 32 having a central opening 36 formed therein, in registration with the hollow interior of the post 12, as well as a vertical panel 34 extending upwardly from the horizontal base 32. The bracket 30 is particularly adapted to permit the pedestal 10 to carry an electrical meter 38 and a power box or electrical panel 40. Each of these are affixed to a face of the bracket 30 by use of a plurality of self-tapping screws (not shown). A front face 42 of the upstanding panel 34 bears thereon a legend 44, such as the letters "EP", to indicate that the electrical panel 40 is to be affixed to the front face 42 of the panel 34. Similarly, as shown in FIG. 4, a rear face 46 of the vertical panel 34 includes a legend 48 thereon, such as the letters "ES", to indicate that it is the electrical service meter 39 which is to be affixed to the rear face 46.

A plurality of electrical connections 49 run between the electrical meter 38 and the electrical panel 40 through a coupling contained in a hole 50 formed through the vertical panel 34. The coupling comprises a close nipple 52 through which the connections 49 are disposed. One end of the close nipple 52 is received in a grounding bushing 56 disposed on the front face 42 of the panel 34, connected to the electrical panel 40, while a lock nut 54 is disposed on the rear face 46 of the panel 34, connected to the electrical meter 38. The lock nut 54 is tightened on the close nipple 52 so as to insure firm affixment of the meter 38 and panel 40 to the bracket 30.

The mobile home or other facility is connected to the electrical meter 38 by a conduit 110 extending from the mobile home and along the back of the post 12 the base of the meter 38.

The post 12 carries on it a number of means or devices for supplying other utility services. For example, a water cyclometer or meter 58 is affixed to a bracket 60 carried by the post 12. A phone junction box 62 and a cable television connection 64 are also mounted to the post 12. A plurality of inputs, such as a water meter signal lead 66, a telephone line 68 and a coaxial television cable 70 are provided for supplying input signals to the respective utility supply means 58, 62 and 64. Conventionally, the inputs 66, 68 and 70 are provided from the utility services by underground cables, so that in the use of the pedestal 10 the cables are positioned so as to pass through the lower aperture 18 in the post 12 and extend upwardly through the hollow interior of the post 12 to a location adjacent the associated meters of boxes 58, 62 and 64. Preferably, a plurality of holes 72, 74 and 76, respectively, are drilled or provided as knockouts beneath the location of the meters and boxes 58, 62 and 64, so as to permit connection of the inputs 66, 68 and 70 to their respective devices 58, 62 and 64. Preferably, a plurality of letter indicia 78 are formed in the surface of the post 12 immediately adjacent to the holes 72, 74 and 76, in order to differentiate between them. For water, telephone and cable television services, these indicia are conveniently W, P and C.

The pedestal 10 of the present invention also comprises a common grounding means 80 contained within the post, serving to ground all of the utility supply means 58, 62 and 64, as well as any other which it may be desired to provide. The common grounding means 80 first comprises a common ground wire 82 extending downwardly in the hollow interior of the post 12 and out of the lower aperture 18 to a ground rod 86. The common ground wire 82 is attached to the ground rod 86 by a clamp 88. The common ground wire 82 also extends upwardly through the opening 36 in the horizontal base 32 of the L-shaped bracket 30, and is connected to a connector 90 on the grounding bushing 56. Preferably, the electrical panel 40 includes a neutral bar 92 affixed to its back, and the wire 82 extends to and is electrically connected to the neutral bar 92.

The common grounding means 80 also includes a shared electrical connection 94 to which the common ground wire 82 and the utility supply means 58, 62 and 64 are connected. The utility supply means 58, 62 and 64 are preferably connected to the shared connector 94 by conventional ground straps (not shown). The shared connector 94 preferably comprises a grounding bar 96 of generally known type, including a plurality of lateral perforations or holes 97 receiving therein wires to be connected in common, and a plurality of screw heads 99 for affixing the connected wires in the holes 97.

Additionally, other utility supply means such as gas meters can be connected to the common ground in a different way. Many municipalities require that gas supply means and meters be grounded to a bracket carrying the meters. In such localities, a bracket 98 for carrying a gas meter is fastened to the post 12 by means of self-tapping screws (not shown), and grounded to the shared electrical connector 94 by a preconnected grounding means 100 embedded partly in the post 12 (FIGS. 1 and 3). The grounding means 100 comprises a gas ground wire 102 connected at one end to the shared electrical connector 94, and on its other to a retainer 104, affixed thereto by a setscrew 106. The retainer 104 and setscrew 106 also engage a bolt 108 which simultaneously electrically connects the bracket 98 to the ground wire 102, and further serves to affix the bracket 98 to the post 12. The gas meter can then be grounded to the bracket 98 in any conventional fashion. The gas meter is then connected to a gas main by a conduit in the well known manner. The electrical meter 38 carried by the post 12 is preferably connected to the electrical service main in any conventional fashion.

The common ground wire 82 can comprise any wire adequate for grounding purposes, but preferably comprises a single continuous wire from the ground rod 86 and to the electrical panel neutral bar 92, composed as a single wire of No. 6 bare-stranded copper.

The pedestal 10 according to the present invention thus provides a structurally sound, easily assembled and well grounded assembly particularly convenient for use with mobile homes. The service lines for a number of utilities extend underground into the post 12 through the lower aperture 18, and are thus protected against damage by moving vehicles, or by mobile homes while being installed or removed. The elongated upper aperture 26 provides ready access for straightforward affixment of the various utility supply means. Most importantly, the use of plastic for the post material avoids the cost and susceptibility to corrosion of a metal post, while insuring adequate grounding of the utility devices, and avoiding the possibility of shorting of the ground or any power lines against a metal post.

Although I have described my invention as especially useful for mobile homes it should be understood that it can be used in any situation where multiple utilities are to be provided to a simple facility.

Having described my invention, however, many modifications thereto will become apparent to those skilled in the art to which it pertains, without deviation from the spirit of the present invention, as defined by the scope of the appended claims.

I claim:

1. An apparatus for simultaneously supporting a plurality of groundable utility supply means and providing a prewired common ground to said plurality of supply means, comprising:
   a plurality of groundable utility supply means, said plurality of supply means including an electrical panel having an affixed neutral bar;
   an elongated, hollow, nonconductive plastic post;
   means mounting said plurality of utility supply means to said post;
   common ground means contained in said post, comprising a single continuous ground wire connectable to said electrical panel neutral bar and extending interiorly of said post, and a grounding bar disposed within said post and connected to said ground wire; and
   means adapted to ground each of said utility supply means to said grounding bar.

2. The invention according to claim 1, wherein said post includes an aperture generally opposite said means mounting said utility supply means, and wherein said ground wire extends through said aperture for connection to earth.

3. The invention according to claim 1, wherein said plurality of supply means includes an electrical service meter and said mounting means comprises an L-shaped plate carried atop said post and dimensioned to support said electrical panel and said electrical service meter thereon.

4. The invention according to claim 1, wherein said post includes at least one of perforations and knockouts for passage through said post of at least one of inputs to said utility supply means, service wires to said utility supply means and ground wires to said utility supply means.

5. The invention according to claim 1, further comprising a grounding rod external to said post, and means connecting said ground wire to said ground rod.

6. The invention according to claim 3, further comprising a grounding bushing disposed through said L-shaped plate serving as a raceway for electrical service from said electrical meter to said electrical panel.

7. The invention according to claim 6, further comprising means grounding said grounding bushing to said ground wire.

8. The invention according to claim 1, wherein said post includes an elongated aperture in at least the area of said grounding bar.

9. The invention according to claim 8, further comprising a removable cover covering said aperture.

10. The invention according to claim 1, further comprising at least one drain hole in said post.

11. The invention according to claim 1, further comprising a pair of feet affixed to said post.

12. The invention according to claim 1, wherein said post includes a plurality of diagonal reinforcing ribs.

13. The invention according to claim 1, wherein said post is of unitary construction.

* * * * *